United States Patent [19]

Roffman et al.

[11] Patent Number: 5,485,228

[45] Date of Patent: Jan. 16, 1996

[54] MULTIFOCAL OPHTHALMIC LENS PAIR

[75] Inventors: Jeffrey H. Roffman; Timothy R. Poling, both of Jacksonville, Fla.; Michel Guillon, London, England; Edgar V. Menezes, Jacksonville, Fla.

[73] Assignee: Johnson & Johnson Vision Products, Inc., Jacksonville, Fla.

[21] Appl. No.: 246,644

[22] Filed: May 20, 1994

Related U.S. Application Data

[63] Continuation of Ser. No. 988,071, Dec. 9, 1992, abandoned, which is a continuation-in-part of Ser. No. 827,199, Jan. 28, 1992, abandoned, which is a continuation-in-part of Ser. No. 728,903, Jul. 10, 1991, Pat. No. 5,198,844.

[51] Int. Cl.$^6$ .................................................. G02C 7/04
[52] U.S. Cl. ............................................ 351/161; 351/177
[58] Field of Search ........................... 351/160 R, 160 H, 351/161, 162, 177

[56] References Cited

U.S. PATENT DOCUMENTS

| | | | |
|---|---|---|---|
| 4,704,016 | 11/1987 | de Carle | 351/161 |
| 4,890,913 | 1/1990 | De Carle et al. | 351/161 |
| 4,923,296 | 5/1990 | Erickson | 351/161 |
| 5,002,382 | 3/1991 | Seidner | 351/161 |
| 5,024,517 | 6/1991 | Seidner | 351/161 |
| 5,056,909 | 10/1991 | Brown | 351/177 |
| 5,151,723 | 9/1992 | Tajiri | 351/161 |

FOREIGN PATENT DOCUMENTS

| | | | |
|---|---|---|---|
| 0107444 | 5/1984 | European Pat. Off. | G02C 7/06 |
| 0201231A2 | 4/1986 | European Pat. Off. | |
| 0445994 | 9/1991 | European Pat. Off. | G02C 7/06 |
| 0453136 | 10/1991 | European Pat. Off. | G02C 7/04 |

*Primary Examiner*—Scott J. Sugarman

[57] ABSTRACT

A pair of ophthalmic lenses both containing at least two optical powers, one for near vision and one for distance vision are described, both containing in the center portion of the lens the distance optical power. In the preferred embodiment, the remainder of the lens is comprised of annular portions made up of one or more optical zones to provide the desired combined, cumulative ratio of near and distance focal length areas at each pupil diameter. The distance portion located in the center is appropriately suited to the real world situation of requiring distance vision under high illumination situations.

25 Claims, 2 Drawing Sheets

MULTIFOCAL OPHTHALMIC LENS PAIR

This is a continuation of application Ser. No. 07/988,071, filed Dec. 9, 1992, now abandoned which is a continuation-in-part of application Ser. No. 07/827,199 filed on Jan. 28, 1992, now abandoned, which in turn is a continuation-in-part of application Ser. No. 07/728,903 filed on Jul. 10, 1991 now U.S. Pat. No. 5,198,844.

BACKGROUND OF THE INVENTION

This invention pertains to the subject of ophthalmic lenses, and in particular contact lenses containing more than one optical power or focal length.

It is well known that as an individual ages, the eye is less able to accommodate, i.e., bend the natural lens in the eye in order to focus on objects that are relatively near to the observer. This condition is referred to as presbyopia, and presbyopes have in the past relied upon spectacles or other lenses having a number of different regions with different optical powers to which the wearer can shift his vision in order to find the appropriate optical power for the object or objects upon which the observer wishes to focus.

With spectacles this process involves shifting one's field of vision from typically an upper, far power to a different, near power. With contact lenses, however, this approach has been less than satisfactory. The contact lens, working in conjunction with the natural lens, forms an image on the retina of the eye by focusing light incident on each part of the cornea from different field angles onto each part of the retina in order to form the image. This is demonstrated by the fact that as the pupil contracts in response to brighter light, the image on the retina does not shrink, but rather, light coming through a smaller area of the lens constructs the entire image.

Similarly, for a person that has had the natural lens of the eye removed because of a cataract condition and an intraocular lens inserted as a replacement, the ability to adjust the lens (accommodate) to the distance of the object being viewed is totally absent. In this case, the lens provided is usually set at the singe infinity distance focal power and spectacles are worn to provide the additional positive optical power needed for in-focus close vision. For such a patient, a functional multifocal lens would be particularly useful.

It is known in the art that under certain circumstances that the brain can discriminate separate competing images by accepting the in-focus image and rejecting the out-of-focus image.

One example of this type of lens used for the correction of presbyopia by providing simultaneous near and far vision is described in U.S. Pat. No. 4,923,296 to Erickson. Described therein is a lens system which comprises a pair of contact lenses each having equal areas of near and distant optical power, the lens for one eye with a near upper half and a distant lower half while the lens for the other eye contains a distant upper half and near lower half. Together these are said to provide at least partial clear images in both eyes, and through suppression by the brain of the blurred images, allows alignment of the clear image to produce an in-focus image.

U.S. Pat. No. 4,890,913 to de Carle describes a bifocal contact lens comprising a number of annular zones having different optical powers. The object in the design of this lens is to maintain, at all times regardless of pupil diameter, an approximately equal division between near and distant powers, requiring on the lens between 6 and 12 total zones.

Another attempt at providing a bifocal contact lens is described in U.S. Pat. No. 4,704,016 to de Carle. Again, this lens attempts to maintain, at all times regardless of pupil diameter, an approximately equal division between near and distant powers.

Another approach to producing a multifocal corrective eye lens involves the use of diffractive optics. One of the shortcomings of this approach has been a deficiency in vision at low light levels. In a diffractive design only about 40% of the light incident on the lens is used for near vision with another 40% being used for far vision. The remaining 20% is not used for either near or far vision, but rather is lost to higher orders of diffraction and scatter effect. This represents the best theoretical case and in manufacturing reality even less light is available due to manufacturing difficulties. Difficulty of manufacture in general represents another shortcoming of diffractive lenses since the diffractive surface must be to tolerances on the order of the wavelength of light.

One attempt known in the art to provide a method of compensating for presbyopia without complex lens manufacture is known as "monovision". In the monovision system a patient is fitted with one contact lens for distant vision in one eye and a second contact lens for near vision in the other eye. Although it has been found that with monovision a patient can acceptably distinguish both distance and near objects, there is a substantial loss of binocularity, i.e. depth perception.

Although simple systems such as monovision are somewhat understood, more complex schemes for multifocal refractive lenses are primarily theoretical.

U.S. Pat. Nos. 5,002,382 and 5,024,517 both issued to Seidner, disclose complementary pairs of contact lenses having two or more corrective optical powers in opposite configurations. Both of the lens pairs described are closely related to the monovision concept: the pair has a central power disparity between lenses, and fails to effect a power ratio adjustment as a function of illumination.

European Patent Application, Publication number 0 201 231 A2 by Ho, et al. describes a binocular pair of contact lenses having a plurality of optical zones that are complementary between lenses, i.e. opposite alternate zones of near and distance powers.

A more practical and improved approach to providing a multi-focal ophthalmic lens is described in copending application Ser. No. 7/827,199 filed on Jan. 28, 1992. In this application there is disclosed a multifocal ophthalmic lens characterized by having a central zone wherein one of the multifocal segments includes the central zone of the lens. The boundary between the segments is defined by an arcuate path such as a semi-circle having both ends of the path on the adjoining parameter of the near and distant segments to eliminate from the central optical axis the segment boundaries including the central junction point.

While the lenses made according to the above described applications are functional and the manufacturing techniques described therein are a practical way of molding ophthalmic lenses, an important aspect of proper multifocal vision under various light conditions has not been met.

Under real-world conditions, the ability of the brain to discriminate between (or among) two or more images where only one is in-focus is greatly enhanced if the central part of the image consists of only one focal length. It has also been found that high levels of illumination typically are accompanied by distance vision situations.

It is an object, therefore, of the present invention to provide a pair of ophthalmic lenses for a presbyope that yields improved visual acuity in general, and particularly under high intensity light conditions.

It is a further object of the invention to describe a method for determining the manner in which such lenses are to be fitted to a patient to produce the desired improvement in vision, especially by matching the optical power required for a high illumination situation.

SUMMARY OF THE INVENTION

The above objects are achieved by providing a pair of ophthalmic lenses both containing at least two optical powers, one for near vision and one for distance vision. Both lenses, however, contain in the center portion of the lens the distant power. In the preferred embodiment, the remainder of the lens is comprised of annular portions each made of one or more optical zones to provide the desired combined, cumulative ratio of near and distance focal length areas at each pupil diameter.

In this way, the center portion of the vision contains a single optical power which results in improved visual acuity. This distance portion in the center is particularly well suited to the real world situation of requiring distance vision under high illumination situations.

DESCRIPTION OF THE PREFERRED EMBODIMENT

As is well known in the art, people have a dominant eye. This eye can be found by having the patient look through an opaque sheet with a hole in it. The patient is asked to sight a distant object by looking through the hole. When properly arranged, the hole in the sheet, the size of the hole and the distance from the patient's eye allows the distant object to be seen through the hole in the sheet by only one eye at a time.

After the patient has sighted the object through the hole, the eyes are alternately covered to determine which eye has been used to sight the object, and is therefore, the dominant eye. In most people, the right eye is the dominant eye.

It has been found that a crucial characteristic in the construction of a multifocal ophthalmic lens needed to attain visual acuity, is that a single central focal length be maintained and disparity in the central visual region be avoided. Although the importance of this in a single lens was recognized in my prior above-referenced patent application (wherein the central zone of a single lens maintains a single optical power without a boundary or junction point between different optical powers of a multifocal lens), it has now been recognized that it is important to establish a single optical power on the two lenses placed in the eyes of a patient.

It has been found, as described in copending application, "Pupil-Tuned Multifocal Ophthalmic Lens," Ser. No. 07/988,088 filed concurrently herewith and in combination with the present invention the preferred embodiment is thereby derived, that in real world conditions, high intensity illumination situations generally are accompanied by the need to focus at a distance.

For this reason the lens pair of the present invention contains at its central portion in both lenses the distant optical power required by the patient.

Figure 1:
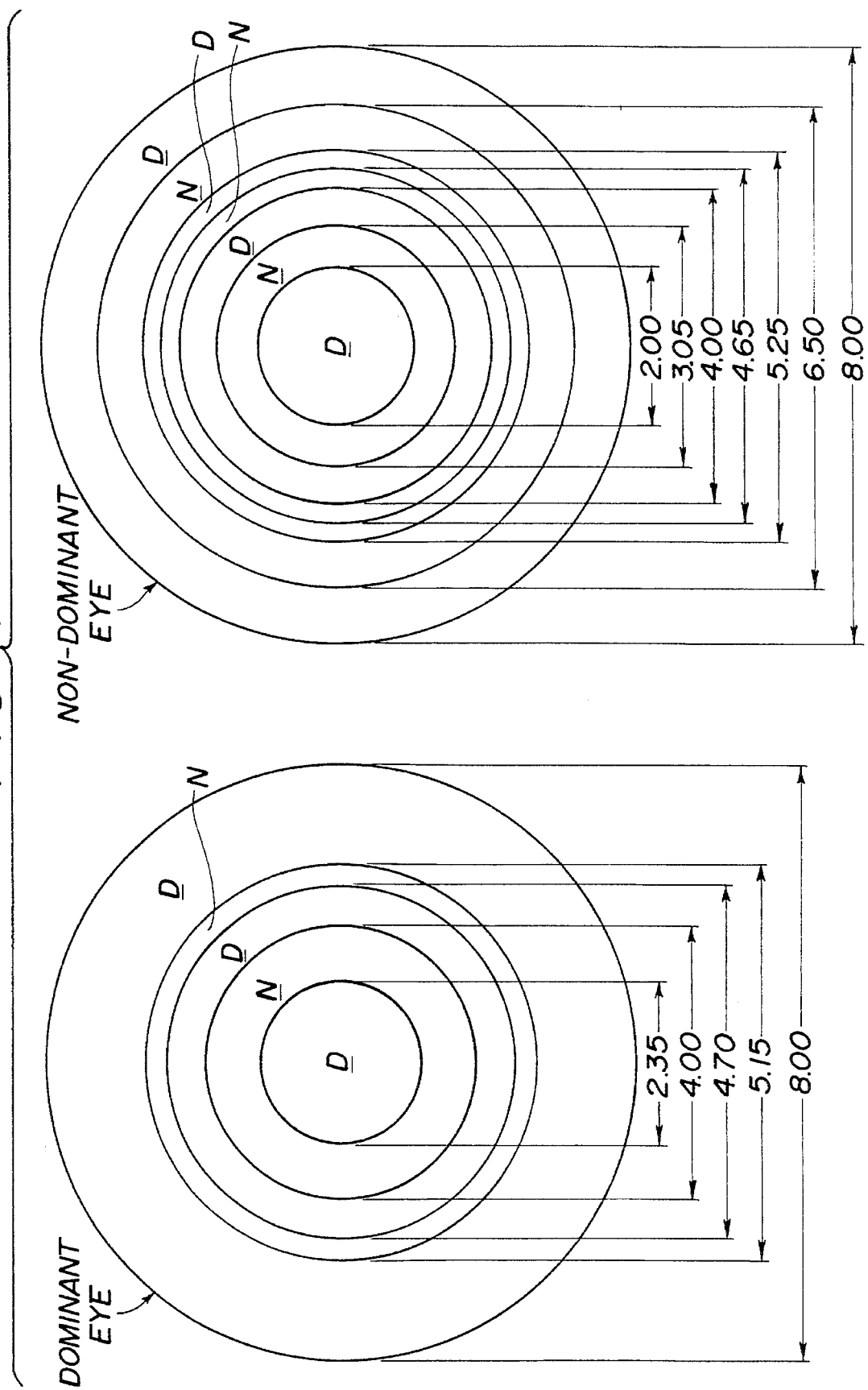
FIG. 1 shows the optical zone of a pair of ophthalmic lenses constructed according to the principles of the present invention.

Referring to FIG. 1 there is shown the optical zone of a pair of ophthalmic lenses constructed according to the present invention. The typical contact lens is usually constructed with a non-optical lenticular area (not shown) outside the optical surface for a total diameter of 14 mm.

A comparison of the annular zones of the two lenses reveals the important aspects of the present invention. First, both lenses contain a central zone that has the distant optical power for the patient. Second, the remaining zones of both lenses combined contain cumulative near and distant powers to yield the desired ratio of near and distance powers.

The following Table I shows the actual specifications for the distribution of the near and distant power as a function of the diameter through the center of the optical axis.

TABLE I

| BINOCULAR SET-ZONE TRANSITIONS | | | | |
|---|---|---|---|---|
| PUPIL | DOMINANT EYE | | NON-DOMINANT EYE | |
| DIAMETER | Distance | Near | Distance | Near |
| 0.00 | 100 | 0 | 100 | 0 |
| 0.50 | 100 | 0 | 100 | 0 |
| 1.00 | 100 | 0 | 100 | 0 |
| 1.50 | 100 | 0 | 100 | 0 |
| 2.00 | 100 | 0 | 0 | 100 |
| 2.35 | 0 | 100 | 0 | 100 |
| 2.50 | 0 | 100 | 0 | 100 |
| 3.00 | 0 | 100 | 0 | 100 |
| 3.05 | 0 | 100 | 100 | 0 |
| 3.50 | 0 | 100 | 100 | 0 |
| 4.00 | 100 | 0 | 0 | 100 |
| 4.50 | 100 | 0 | 0 | 100 |
| 4.65 | 100 | 0 | 100 | 0 |
| 4.70 | 0 | 100 | 100 | 0 |
| 5.00 | 0 | 100 | 100 | 0 |
| 5.15 | 100 | 0 | 100 | 0 |
| 5.25 | 100 | 0 | 0 | 100 |
| 5.50 | 100 | 0 | 0 | 100 |
| 6.00 | 100 | 0 | 0 | 100 |
| 6.50 | 100 | 0 | 100 | 0 |
| 7.00 | 100 | 0 | 100 | 0 |
| 7.50 | 100 | 0 | 100 | 0 |
| 8.00 | 100 | 100 | 100 | 0 |

Figure 2:
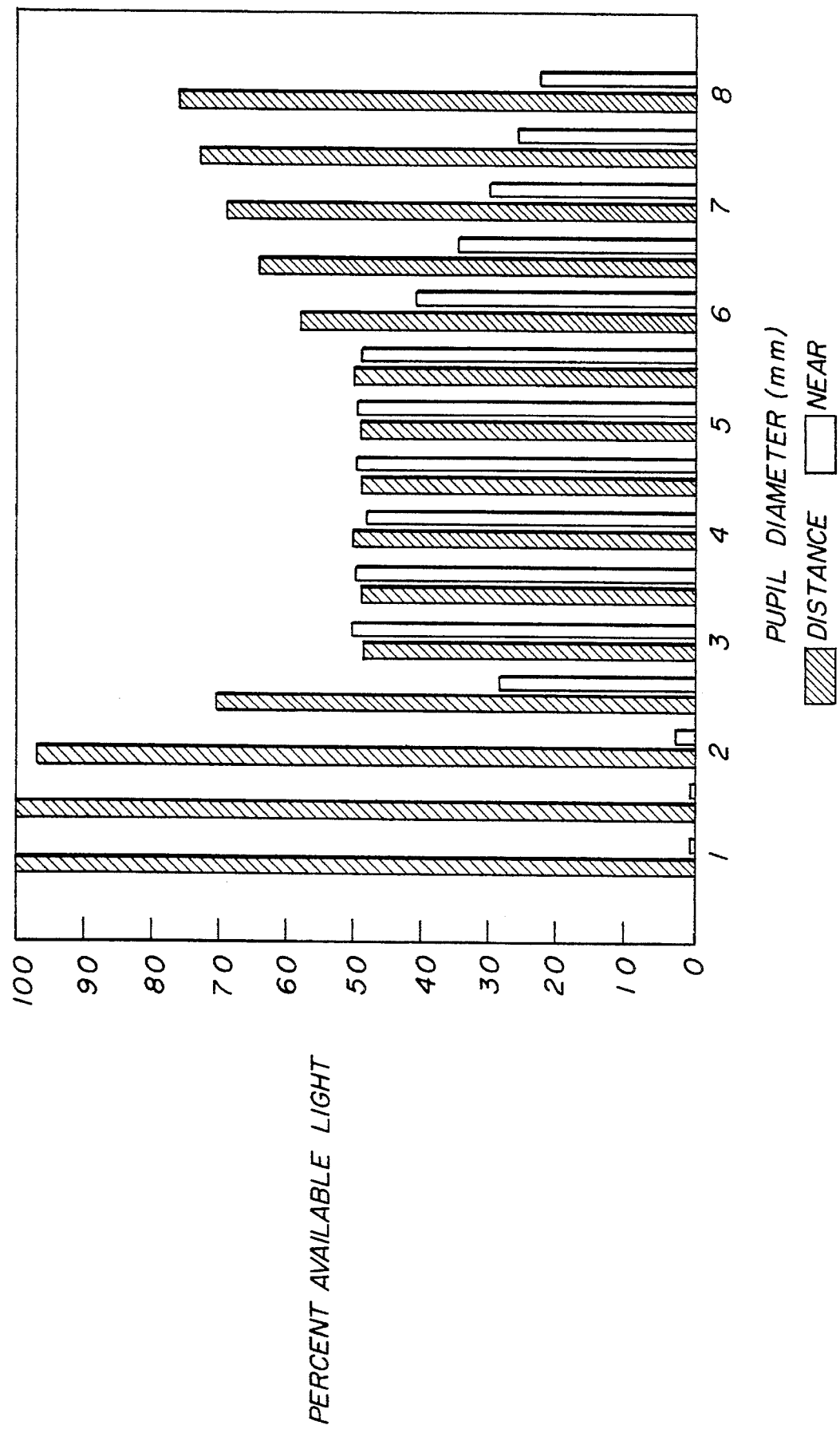
FIG. 2 is a bar graph comparing the fraction of available light striking the pupil for near and distant focal lengths for the ophthalmic lens pair of FIG. 1 as a function of pupil diameter.

The advantage of a lens constructed according to the above design is readily apparent from FIG. 2.

While both lenses of the pair have a center portion in the optical zone that is dedicated to distant vision (the power determined to be required under most real-world conditions), FIG. 2 shows as the pupil diameter increases, the light going through the pupil becomes evenly divided between near and distant focal lengths. This provides adequate viewing at both near and far distances as the available light diminishes.

The following Table II shows numerically for the dominant eye lens and non-dominant eye lens, the ratio between the area at each pupil diameter of the surface devoted to the distant focal length and the near focal length.

In addition, the third part of this Table shows the sum, on a percentage basis, for both lenses in the pair for distant and near surface area.

TABLE II

FOCAL LENGTH RATIOS

| | DOMINANT EYE | | NON-DOMINANT EYE | | BINOCULAR SUM | |
|---|---|---|---|---|---|---|
| | cumulative area (mm)² | | | | % of total area | |
| Diameter | Distance | Near | Distance | Near | Distance | Near |
| 1 | 0.8 | 0.0 | 0.8 | 0.0 | 100 | 0 |
| 2 | 3.1 | 0.0 | 3.0 | 0.2 | 97.5 | 2.5 |
| 3 | 4.2 | 2.9 | 3.0 | 4.1 | 50.5 | 49.5 |
| 4 | 4.5 | 8.1 | 8.2 | 4.4 | 50.3 | 49.7 |
| 5 | 8.9 | 10.8 | 11.2 | 8.4 | 51.1 | 48.9 |
| 6 | 16.7 | 11.5 | 12.8 | 15.5 | 52.2 | 47.8 |
| 7 | 26.9 | 11.5 | 18.6 | 19.9 | 59.2 | 40.8 |
| 8 | 38.7 | 11.5 | 30.4 | 19.9 | 68.7 | 31.3 |

A comparison of the available light that passes through the distant and near optical zones of the lens that actually enters the pupil of the eye shows that at high illumination levels (when the pupil of the eye is contracted to admit only a small percentage (less than 10%) of the available light through the pupil of the eye), nearly all of it passes through the distant optical zones contained on the pair of lenses.

As the light diminishes and the pupil diameter increases, beginning at approximately 3 mm pupil diameter, it can be seen that the ratio on a cumulative basis of distance focal area to near focal area then becomes approximately equal between the distant and near surface area for light actually entering through the pupil and into the eye.

As an alternative to using concentric annular optical zones, the annular portions may have the requisite ratio of distant and near focal length areas by employing the design scheme found in my copending applications Ser. No. 7/827, 199 filed on Jan. 28, 1992. This design method employs continuous radial segments containing different optical powers across annular portions.

As a further improvement to the specific execution of this lens design, it may be preferred to incorporate the teachings of my earlier U.S. Pat. No. 5,059,981, in the design of the surface of the peripheral zone of the non-dominant eye lens. That is, the incorporation of an aspheric lens design on the near vision portion of the lens containing a peripheral near optical zone.

Other variations on the above described invention are possible by the incorporation of aspheric and the combination of aspheric and spherical on other lens surfaces, but do not depart from the limitations of the invention which are given in the following claims.

We claim:

1. A method of providing multifocal vision correction to a patient, said method comprising the steps of:
   determining the dominant eye of the patient,
   determining the near optical power required for the patient,
   determining the distance optical power required for the patient,
   providing the patient with a pair of lenses having optical surfaces, both lenses containing both the near optical power and the distance optical power with distance optical power at the center of both lenses, a dominant eye lens containing on the lens optical surface more than 50% of said determined distant optical power and a non-dominant eye lens containing on the lens optical surface more than 50% of said determined near optical power.

2. A pair of ophthalmic lenses having optical surfaces, both lenses containing both a near optical power and a distance optical power with distance optical power at the center of both lenses, one lens of said pair containing on the lens optical surface more than 50% said distant optical power and the other lens of said pair containing on the lens optical surface more than 50% said near optical power.

3. The lens of claim 2 wherein the lenses of said lens pair are of an annular, concentric construction.

4. The lens pair of claim 2 wherein between lenses the zones, exclusive of the center zone, have complementary placement of distance optical power and near optical power.

5. The lens pair of claim 2 further comprising an annular portion exterior said central portion containing more near optical power area than distant optical power area such that the total combined near and distance area of the central and annular portions are substantially equal.

6. A method of providing multifocal vision correction to a patient, said method comprising the steps of:
   determining the dominant eye of the patient,
   determining the near optical power required for the patient, determining the distance optical power required for the patient,
   providing the patient with a pair of lenses having optical surfaces, both lenses consisting of the near optical power and the distance optical power with distance optical power at the center of both lenses, a dominant eye lens containing on the lens optical surface more than 50% of said determined distant optical power and a non-dominant eye lens containing on the lens optical surface more than 50% of said determined near optical power.

7. A pair of ophthalmic lenses having optical surfaces, both lenses consisting of a near optical power and a distance optical power with distance optical power at the center of both lenses, one lens of said pair containing on the lens optical surface more than 50% said distant optical power and the other lens of said pair containing on the lens optical surface more than 50% said near optical power.

8. The lens of claim 7 wherein the lenses of said lens pair are of an annular, concentric construction.

9. The lens pair of claim 7 wherein between lenses the zones, exclusive of the center zone, have complementary placement of distance optical power and near optical power.

10. The lens pair of claim 7 further comprising an annular portion exterior said central portion containing more near optical power area than distant optical power area such that the total combined near and distance area of the central and annular portions are substantially equal.

11. A method of providing multifocal vision correction to a patient, said method comprising the steps of:
    determining the dominant eye of the patient,
    determining the near optical power required for the patient,
    determining the distance optical power required for the patient,
    providing the patient with a pair of lenses having optical surfaces, both lenses containing both the near optical power and the distance optical power with distance optical power at the center of both lenses, a dominant eye lens containing on the lens optical surface more than 50% of said determined distant optical power and a non-dominant eye lens containing on the lens optical surface more than 50% of said determined near optical power, said optical powers arranged on the lens surfaces such that at minimum pupil diameter the pupils are exposed to 100% distance optical power and at an increased pupil diameter the pupils are exposed to a proportion of near and distance optical powers which, combined over both lenses of said pair, is equal.

12. A pair of ophthalmic lenses having optical surfaces, both lenses containing both a near optical power and a distance optical power with distance optical power at the center of both lenses, one lens of said pair containing on the lens optical surface more than 50% said distant optical power and the other lens of said pair containing on the lens optical surface more than 50% said near optical power, said optical powers arranged on the lens surfaces such that at minimum pupil diameter the pupils are exposed to 100% distance optical power and at an increased pupil diameter the pupils are exposed to a proportion of near and distance optical powers which, combined over both lenses of said pair, is equal.

13. The lens of claim 12 wherein the lenses of said lens pair are of an annular, concentric construction.

14. The lens pair of claim 12 wherein between lenses the zones, exclusive of the center zone, have complementary placement of distance optical power and near optical power.

15. The lens pair of claim 12 further comprising an annular portion exterior said central portion containing more near optical power area than distant optical power area such that the total combined near and distance area of the central and annular portions are substantially equal.

16. A method of providing multifocal vision correction to a patient, said method comprising the steps of:

determining the dominant eye of the patient, determining the near optical power required for the patient, determining the distance optical power required for the patient, providing the patient with a pair of lenses having optical surfaces, both lenses containing both the near optical power and the distance optical power with distance optical power at the center of both lenses, a dominant eye lens containing on the lens optical surface more than 50% of said determined distant optical power and a non-dominant eye lens containing on the lens optical surface more than 50% of said determined near optical power, said optical powers arranged on the lens surfaces such that at minimum pupil diameter the pupils are exposed to 100% distance optical power and at an increased pupil diameter the pupils are exposed to a proportion of near and distance optical powers which, combined over both lenses of said pair, is always equal to or greater than 50% distance optical power.

17. A pair of ophthalmic lenses having optical surfaces, both lenses containing both a near optical power and a distance optical power with distance optical power at the center of both lenses, one lens of said pair containing on the lens optical surface more than 50% said distant optical power and the other lens of said pair containing on the lens optical surface more than 50% said near optical power, said optical powers arranged on the lens surfaces such that at minimum pupil diameter the pupils are exposed to 100% distance optical power and at an increased pupil diameter the pupils are exposed to a proportion of near and distance optical powers which, combined over both lenses of said pair, is always equal to or greater than 50% distance optical power.

18. The lens of claim 17 wherein the lenses of said lens pair are of an annular, concentric construction.

19. The lens pair of claim 17 wherein between lenses the zones, exclusive of the center zone, have complementary placement of distance optical power and near optical power.

20. The lens pair of claim 17 further comprising an annular portion exterior said central portion containing more near optical power area than distant optical power area such that the total combined near and distance area of the central and annular portions are substantially equal.

21. A method of providing multifocal vision correction to a patient, said method comprising the steps of:

determining the dominant eye of the patient, determining the near optical power required for the patient, determining the distance optical power required for the patient, providing the patient with a pair of lenses having optical surfaces, both lenses containing a plurality of both the near optical power and the distance optical power surfaces in an alternating arrangement with distance optical power at the center of both lenses, a dominant eye lens containing on the lens optical surface more than 50% of said determined distant optical power and a non-dominant eye lens containing on the lens optical surface more than 50% of said determined near optical power.

22. A pair of ophthalmic lenses having optical surfaces, both lenses containing a plurality of both a near optical power and a distance optical power in an alternating arrangement with distance optical power at the center of both lenses, one lens of said pair containing on the lens optical surface more than 50% said distant optical power and the other lens of said pair containing on the lens optical surface more than 50% said near optical power.

23. The lens of claim 22 wherein the lenses of said lens pair are of an annular, concentric construction.

24. The lens pair of claim 22 wherein between lenses the zones, exclusive of the center zone, have complementary placement of distance optical power and near optical power.

25. The lens pair of claim 22 further comprising an annular portion exterior said central portion containing more near optical power area than distant optical power area such that the total combined near and distance area of the central and annular portions are substantially equal.

* * * * *